Nov. 5, 1963

D. B. WHITNEY 3,109,696

METHOD OF MAKING PLASTIC LENSES

Filed May 15, 1962

INVENTOR
DONALD B. WHITNEY
BY
Louis L. Gagnon
ATTORNEY

Nov. 5, 1963 D. B. WHITNEY 3,109,696
METHOD OF MAKING PLASTIC LENSES
Filed May 15, 1962 2 Sheets-Sheet 2
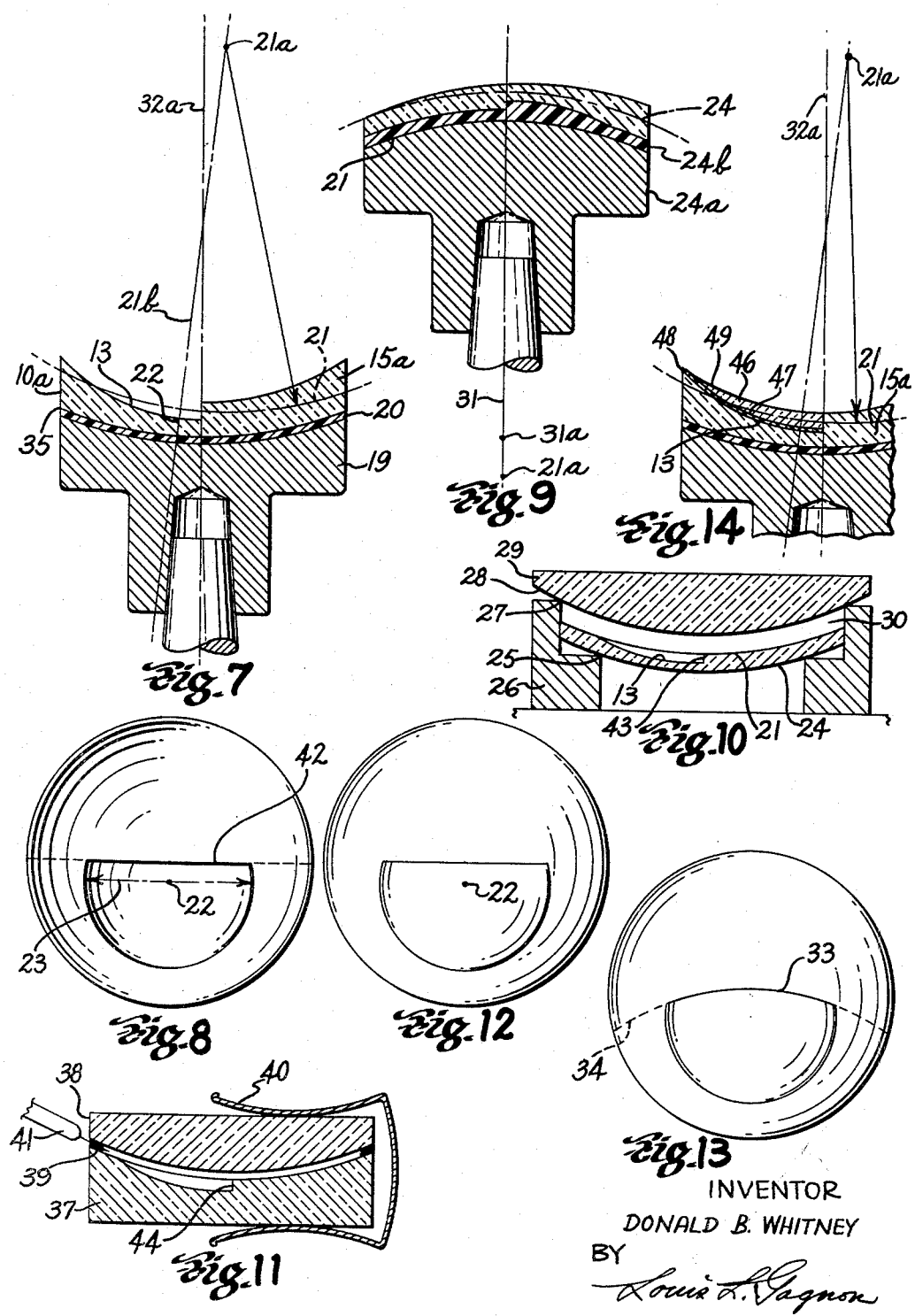
INVENTOR
DONALD B. WHITNEY
BY
Louis L. Gagnon
ATTORNEY

United States Patent Office 3,109,696
Patented Nov. 5, 1963

3,109,696
METHOD OF MAKING PLASTIC LENSES
Donald B. Whitney, Southbridge, Mass., assignor to American Optical Company, Southbridge, Mass., a corporation of Massachusetts
Filed May 15, 1962, Ser. No. 194,945
7 Claims. (Cl. 18—47.5)

This invention relates to improvements in plastic lenses and has particular reference to an improved method of making a mold for producing cast plastic lenses of the multifocal type.

One of the primary objects of the invention is to provide a method of forming a mold component for use in casting plastic lenses from a liquid monomer wherein the resultant surface curvature on one side thereof with the location of the ultimate optical centers of the respective focal fields resulting from said surface curvatures being independently controlled and wherein the ultimate size of the reading field of the lens may be independently controlled.

Another object is to provide a method of the above character whereby a plurality of molds having different selective components may be assembled in a simple and efficient manner for producing multifocal lenses of different desired optical powers.

Another object is to provide, in a method of forming molds of the above character, parts having differently controlled related softening temperatures such as to permit parts embodying different desired characteristics to be assembled without altering said characteristics.

Other objects and advantages of the invention will become apparent from the following description taken in conjunction with the accompanying drawings wherein:

FIG. 7 is a view generally similar to FIG. 6 illustrating additional steps in the fabrication of the mold;

FIG. 8 is a plan view of the mold component as results from the steps of the method illustrated in FIG. 7;

FIG. 9 is a sectional view illustrating another step of the method;

FIG. 10 is a sectional view diagrammatically illustrating one use of the mold formed in accordance with the present invention;

FIG. 11 is a view generally similar to FIG. 10 of a modified form of use of the mold embodying the invention;

FIG. 12 is a face view of a finished lens formed in accordance with the invention;

FIG. 13 is a face view of a modified type of a lens which may be made in accordance with the present invention; and FIG. 14 is a fragmentary sectional view generally similar to FIG. 7 illustrating a further modification of the invention.

Figure 1:
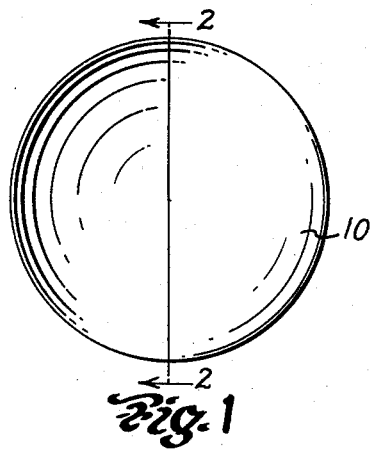
FIG. 1 is a plan view of one of the components utilized in the fabrication of the mold.
Figure 4:
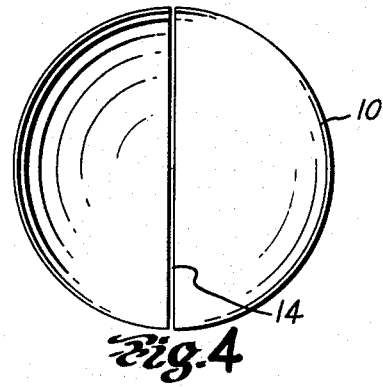
FIG. 4 is a plan view illustrating said step of FIG. 3.
Figure 2:
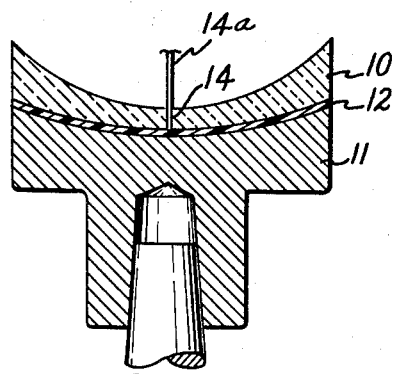
FIG. 2 is a sectional view taken on line 2—2 of FIG. 1 illustrating a certain step of the method of fabricating the mold.

Referring to FIGURES 1 and 2, a disk of glass 10, preferably having a relatively high softening point, is first mounted, as illustrated in FIG. 2, on a block 11 by a suitable layer of adhesive or the like 12. The adhesive 12 may be of any of the commonly known pitch, low-melting metal or other type. The disk 10 is first divided, as illustrated at 14 in FIG. 2, by sawing the disk in two along a transverse line of division.

The above sawing may be accomplished by the use of a disk having a diamond-charged edge of the conventional type or other conventional means 14a.

The surface 13 of the disk 10 is then ground and polished to the curve desired of the reading field to be formed by said mold and is finished to a depth sufficient to remove any flakings along the dividing line 14 which might have been formed during the sawing operation.

Figure 5:
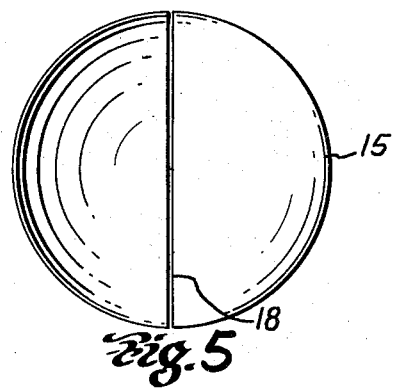
FIG. 5 is a plan view of another component utilized in the fabrication of the mold and illustrating a further step of the method.
Figure 3:
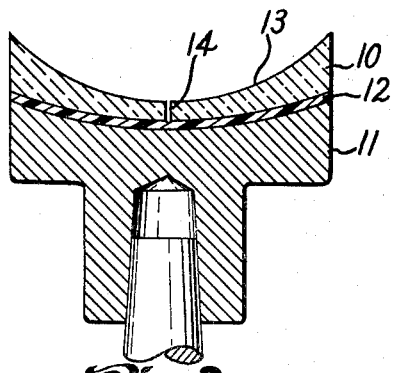
FIG. 3 is a view generally similar to FIG. 2 illustrating another step of the method.
Figure 6:
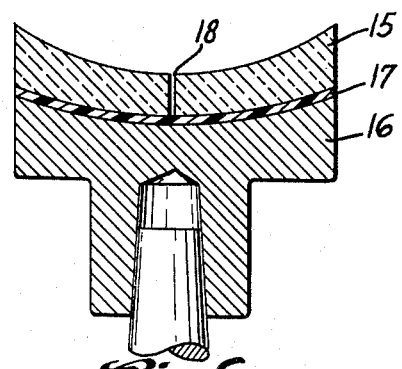
FIG. 6 is a sectional view generally similar to FIG. 3 illustrating said further step.

In FIGS. 5 and 6, there is shown another disk of glass 15 such as flint or barium crown glass having a lower softening point than the disk 10. The disk 15 is preferably of meniscus shape and, like the disk 10, is mounted on a block 16 through the use of a suitable adhesive layer 17. The disk 15 is divided into two sections by sawing along a transverse line 18 in a manner similar to the dividing of the disk 10.

The said disks 10 and 15 are then removed from the respective blocks 11 and 16. The surfaces resulting from the sawing along the lines 14 and 18 respectively are then provided with a surface finish suitable for fusing in any known conventional manner.

One of the segments 10a resulting from the dividing of the disk 10 is then placed and held in edge-to-edge relation with one of the segments 15a resulting from the dividing of the disk 15. This may be accomplished by suitable clamps or other means and by supporting the segments on a suitable refractory in the usual manner. The assembly is then placed in a suitable conventional furnace, not shown, and is subjected to heat of a sufficient temperature to bring about fusion of the respective assembled edge surfaces. The temperature of fushion is controlled, as is possible by reason of the different softening points of the respective glasses of the segments as specified above, so that the previously ground and polished surface 13 of the reading field will not distort during said fusing. The assembled fused segments, as shown in FIG. 7, are then mounted on a block 19 similar to the previous blocks by the use of a suitable layer of adhesive or the like 20. The curvature 21 desired for the distance portion of the lens is then ground and polished on the exposed side of said assembly and is generated about a center 21a lying on a line 21b normal to and which passes through the reading portion of the lens at the location desired of the optical center 22 of said reading portion, as illustrated in FIG. 7. This introduces a prism in the remaining portion of the mold. It is to be noted that the surface 21 is abraded to a suitable depth for producing the diameter 23 desired of the ultimate reading field of the lens and may be independently controlled during said abrading, the deeper the abrading, the smaller the diameter. The mold portion thus formed is then removed from the block 19 and has a surface appearance such as is shown in FIG. 8.

One use of the mold portion thus formed is diagrammatically illustrated in FIG. 10 wherein the opposite surface 24 of the mold is provided with a spherical curvature adapted to engage an internal shouldered ledge 25 of a suitable support 26. In this particular instance, the support 26 is provided with an upper annular edge 27 on which is rested the lower surface 28 formed on a second mold portion 29. The liquid monomer from which the ultimate lens is to be formed is placed within the cavity 30 prior to placing the second mold portion 29 on the support and is of an amount sufficient to produce a finished lens to the desired size and thickness, the thickness being controlled by the initial spacing of the respective surfaces 21 and 28 of said mold portions.

When the surface 24 is formed on the lower mold portion, the said mold portion is secured to a block 24a by pitch or the like 24b so that the center 21a of the curved surface 21 lies on the vertical axis 31 of said block 24a, see FIG. 9. The center 31a about which the curvature of the surface 24 is generated is also located on said axis and will thereby compensate for the prism that was introduced in the mold portion as the result of offsetting the center of curvature 21a of the surface 21 with respect to the vertical axis 32a of the block 19, as specified above, in order to position the optical center 22 of said reading field at its desired ultimate location in the finished lens.

The mold surface 28 may be spherical, toric or any other suitable shape desired depending upon the ultimate characteristic of the lens.

Instead of dividing the disks 10 and 15 respectively along straight transversely extending lines, in instances where it might be desired to provide the upper dividing line 33 of the lens with an upwardly cupped curve, as illustrated in FIG. 13, the said disks may be divided along such a curvature 34, as illustrated by the dash lines in FIG. 13, and then finished, assembled and fused as previously described.

Instead of grinding the surface 24 to a spherical curvature about a center 31a located on the axis 31, as defined above in connection with the showing in FIG. 9, the initial surface 35 of the mold assembly of FIG. 7 could be ground to introduce a prism of an amount which would compensate for the prism introduced by offsetting the center 21a relative to the vertical axis 32a of the block 19 as stated above.

A modified use of the mold resulting from the above-described method is shown in FIG. 11 in which instance the lower mold half 37 would be supported in spaced relation with the upper mold half 38 by a suitable gasket 39 with the parts being held in assembled relation by a suitable clamp or the like 40. The gasket 39 is controlled in thickness in accordance with the thickness desired of the ultimate lens and the monomer used in casting the plastic lens could be inserted internally of the mold by forcing the monomer through a suitable hypodermic needle or the like 41 inserted through the gasket 39.

It is to be noted that, while segments for the reading portion and distance portion of the mold are fused together as shown in FIG. 7, they may be joined by cementing or the like. Care is taken, however, that there will be no visible line of division between the fields other than the cliff-like edge 42 which results from the cliff 43 or 44 of the lower mold portion, depending upon which of the casting techniques are employed.

In FIG. 14, there is shown another modification wherein, prior to grinding and polishing the surface 21, a filler piece of glass 46 having a surface 47 formed thereon which is substantially contrageneric to the surface 13 formed on the segment 10a is secured to said surface 13 by a layer of adhesive 48 such as Canada balsam or the like. The said filler piece 46 is provided with an outer surface 49 of substantially the same shape as the upper surface of the segment 15a and which is substantially flush with said upper surface.

The function of the said filler piece 46 is to provide an additional support for the abrading tool which generates the surface 21.

It is to be understood that the generation of said surface 21, as well as any of the other surfaces, which are ground and polished is formed with conventional type surface generating machinery commonly used in the art. For example, the surface 21 might be generated by the use of a curve generating machine such as shown and described in U.S. Patent No. 2,724,218 issued November 22, 1955, to O. W. Dillon et al., and may thereafter be polished in any known conventional manner.

Subsequent to the generating of the surface 21, as defined above, the remaining part of the filler piece 46 is removed from the surface 13. This may be accomplished by the use of heat or through the use of a suitable solvent.

It is further to be understood that in casting the lenses, a monomer of the desired plastic is placed inwardly of the mold cavity formed as described above and is then allowed to harden and set to the shape of the inner surfaces of said mold cavity.

From the foregoing description, it will be seen that simple, efficient, and economical methods have been provided for accomplishing all of the objects and advantages of the invention.

Having described my invention, I claim:

1. The method of forming a mold portion for casting plastic lenses comprising mounting a first disk of relatively rigid material onto a holder, dividing said disk into two sections, grinding and polishing a predetermined first surface curvature on the exposed side of said divided disk, mounting a second disk of rigid material on a holder, dividing said second disk into two sections, removing said respective divided disks from said holders, placing the divided edge of a section of said first disk in edge-to-edge relation with the divided edge of a section of said second disk, securing said edges together while in said relation and grinding and polishing a second surface on said assembled sections of a predetermined curvature in overlapping relation with and at such an angle with respect to the first surface formed on said section of said first disk as to position the ultimate optical center of the portion of the cast lens resulting from said surface at a desired location and simultaneously controlling the depth of said grinding and polishing of said second surface so as to reduce the focal field resulting from said first surface to the desired size and shape.

2. The method of forming a mold portion for casting plastic lenses comprising mounting a first disk of glass onto a holder, dividing said disk into two sections, grinding and polishing a predetermined first surface curvature on the exposed side of said divided disk, mounting a second disk of glass on a holder, dividing said second disk into two sections, removing said respective divided disks from said holders, finishing the divided edges of said disks to a surface of a fusible texture, placing the divided edge of a section of said first disk in edge-to-edge relation with the divided edge of a section of said second disk, fusing said edges together and grinding and polishing a second surface on said fused sections of a predetermined curvature in overlapping relation with and at such an angle with respect to the first surface formed on said section of said first disk as to position the ultimate optical center of the portion of the cast lens resulting from said surface at a desired location and simultaneously controlling the depth of said grinding and polishing of said second surface so as to reduce the focal field resulting from said first surface to the desired size and shape.

3. The method of forming a mold portion for casting plastic lenses comprising mounting a first disk of relatively rigid material onto a holder, dividing said disk into two sections, grinding and polishing a predetermined first surface of a relatively short radius of curvature on the exposed side of said divided disk, mounting a second disk of rigid material on a holder, dividing said second disk into two sections, removing said respective divided disks from said holders, placing the divided edge of a section of said first disk in edge-to-edge relation with the divided edge of a section of said second disk, securing said edges together while in said relation and grinding and polishing a second surface on said assembled sections of a predetermined relatively long radius of curvature in overlapping relation with and at such an angle with respect to the first surface formed on said section of said first disk as to position the ultimate optical center of the portion of the cast lens resulting from said surface at a desired location and simultaneously controlling the depth of said grinding and polishing of said second surface so as to reduce the focal field resulting from said first surface to the desired size and shape.

4. The method of forming a mold portion for casting plastic lenses comprising mounting a first disk of glass having a relatively high melting point onto a holder, dividing said disk into two sections along an intermediate line transversely of said disk, grinding and polishing a predetermined first surface of a relatively short radius of curvature on the exposed side of said divided disk and to a depth sufficient to remove any flakes which might be present along the divided edges, mounting a second disk of glass having a relatively low melting point on a holder, dividing said second disk into two sections along an intermediate line transversely of said disk, removing said respective divided disks from said holders, finishing the divided edges of said respective disks to a surface of a fusible texture, placing the divided edge of a section of said first disk in edge-to-edge relation with the divided edge of a section of said second disk, fusing said edges together while in said relation and at a temperature which will have no distorting effect upon said first finished surface curvature, and grinding and polishing a second surface on said fused sections of a predetermined relatively long radius of curvature in overlapping relation with and at such an angle with respect to the first surface formed on said section of said first disk as to position the ultimate optical center of the portion of the cast lens resulting from said surface at a desired location and simultaneously controlling the depth of said grinding and polishing of said second surface so as to reduce the focal field resulting from said first surface to the desired size and shape.

5. The method of casting plastic lenses having at least a reading and a distance field comprising mounting a first disk of relatively rigid material onto a holder, dividing said disk into two sections, grinding and polishing a predetermined first surface on the exposed side of said divided disk and to the curvature desired of the reading field of the lens, mounting a second disk of rigid material on a holder, dividing said second disk into two sections, removing said respective divided disks from said holders, placing the divided edge of a section of said first disk in edge-to-edge relation with the divided edge of a section of said second disk, securing said edges together while in said relation, grinding and polishing a second surface on said assembled sections, to the curvature desired for the distance field of the lens, in overlapping relation with and at such an angle with respect to the first surface formed on said section of said first disk as to position the ultimate optical center resulting from said surface in the cast finished lens at a desired location in said reading field and simultaneously controlling the depth of said grinding and polishing of said second surface so as to reduce the focal field resulting from said first surface to the desired size and shape, forming a ground and polished surface of desired shape on a third disk of rigid material, supporting the ground and polished surfaces of said assembly and the ground and polished surface of said third disk in predetermined spaced relation with each other and placing a monomer of the desired plastic inwardly of said surfaces and allowing the same to harden to the shape of said surfaces.

6. The method of forming a mold portion for casting plastic lenses having at least a reading and a distance field comprising mounting a first disk of glass onto a holder, dividing said disk into two sections, grinding and polishing a predetermined first surface on the exposed side of said divided disk and to the curvature desired of the reading field of the lens, mounting a second disk of glass on a holder, dividing said second disk into two sections, removing said respective divided disks from said holders, placing the divided edge of a section of said first disk in edge-to-edge relation with the divided edge of a section of said second disk, securing said edges together while in said relation, grinding and polishing a second surface on said assembled sections, to the curvature desired for the distance field of the lens, in overlapping relation with and at such an angle with respect to the first surface formed on said section of said first disk as to position the ultimate optical center resulting from said surface in the cast finished lens at a desired location in said reading field and simultaneously controlling the depth of said grinding and polishing of said second surface so as to reduce the focal field resulting from said first surface to the desired size and shape, forming a ground and polished surface of desired shape on a third disk of glass, supporting the ground and polished surfaces of said assembly and the ground and polished surface of said third disk in predetermined spaced relation with each other and placing a monomer of the desired plastic inwardly of said surfaces and allowing the same to harden to the shape of said surfaces.

7. The method of forming a mold portion for casting plastic lenses having at least a reading field and a distance field comprising mounting a first disk of glass onto a holder, dividing said disk into two sections, grinding and polishing a predetermined first surface on the exposed side of said divided disk and to the curvature desired of the reading field of the lens, mounting a second disk of glass on a holder, dividing said second disk into two sections, removing said respective divided disks from said holders, placing the divided edge of a section of said first disk in edge-to-edge relation with the divided edge of a section of said second disk, securing said edges together while in said relation, placing a filler piece of glass on said surface of said section of the first disk and grinding and polishing a second surface on said assembled sections, to the curvature desired of the distance field of the lens, in overlapping relation with and at such an angle with respect to said first surface formed on said section of said first disk as to position the ultimate optical center resulting from said surface in the cast finished lens at a desired location in said reading field and simultaneously controlling the depth of said grinding and polishing of said second surface so as to reduce the focal field resulting from said first surface to the desired size and shape.

No references cited.